US012022039B2

(12) United States Patent
Fujisaki

(10) Patent No.: US 12,022,039 B2
(45) Date of Patent: Jun. 25, 2024

(54) IMAGE READING APPARATUS AND CONTROL METHOD FOR DETERMINING A BLANK PAGE

(71) Applicant: SHARP KABUSHIKI KAISHA, Sakai (JP)

(72) Inventor: Tatsuya Fujisaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/983,235

(22) Filed: Nov. 8, 2022

(65) Prior Publication Data

US 2023/0145962 A1    May 11, 2023

(30) Foreign Application Priority Data

Nov. 8, 2021    (JP) ................................ 2021-182022

(51) Int. Cl.
*H04N 1/00*          (2006.01)
(52) U.S. Cl.
CPC ....... *H04N 1/00803* (2013.01); *H04N 1/0071* (2013.01); *H04N 1/00713* (2013.01); *H04N 1/00726* (2013.01); *H04N 1/00737* (2013.01); *H04N 1/00748* (2013.01); *H04N 1/00816* (2013.01)
(58) Field of Classification Search
None
See application file for complete search history.

(56) References Cited

U.S. PATENT DOCUMENTS

| 9,369,599 B2 | 6/2016 | Yabuuchi | |
| 9,706,070 B2* | 7/2017 | Morikawa | .......... H04N 1/00771 |
| 2006/0291013 A1* | 12/2006 | Shimizu | ............... G03G 15/607 |
| | | | 358/498 |
| 2014/0320934 A1* | 10/2014 | Muraishi | ............. H04N 1/4074 |
| | | | 358/453 |

(Continued)

FOREIGN PATENT DOCUMENTS

| JP | 2016032222 A | * | 3/2016 |
| WO | 2014/192613 A1 | | 12/2014 |

OTHER PUBLICATIONS

Totsuka, JP-2016032222-A English Translation, Figs 7, 8, par 0004, 0016-0033 (Year: 2016).*

*Primary Examiner* — Miya J Cato
(74) *Attorney, Agent, or Firm* — ScienBiziP, P.C.

(57) ABSTRACT

An image reading apparatus includes: a document size detector that detects either a length or a width of a fed document before reading, and associates the document with a standard size equal to or approximate thereto; an image reading device that reads a document and surroundings thereof at a reading position; a background color plate to be read as an image of the surroundings; a document area determiner that determines a document area; and a blank page determiner that determines a blank page determination area for determining whether a document is a blank page or not. When either of the detected length or width is equal to or more than a predetermined threshold value, the blank page determiner determines the blank page determination area, based on the associated standard size, and otherwise determines the blank page determination area, based on the document area.

6 Claims, 9 Drawing Sheets

(56) References Cited

U.S. PATENT DOCUMENTS

| | | | |
|---|---|---|---|
| 2015/0156358 A1* | 6/2015 | Yabuuchi | H04N 1/00718 358/462 |
| 2015/0181064 A1* | 6/2015 | Yabuuchi | H04N 1/00803 358/406 |
| 2015/0288838 A1* | 10/2015 | Tanaka | H04N 1/00708 358/474 |
| 2015/0326743 A1 | 11/2015 | Yabuuchi | |
| 2022/0337717 A1* | 10/2022 | Fujisaki | H04N 1/00816 |
| 2023/0145962 A1* | 5/2023 | Fujisaki | H04N 1/00713 358/1.12 |

* cited by examiner

IMAGE READING APPARATUS AND CONTROL METHOD FOR DETERMINING A BLANK PAGE

BACKGROUND OF THE INVENTION

Field of the Invention

The present disclosure relates to an image reading apparatus and a control method for image reading, and more particularly to an image reading apparatus having a function of discriminating a contour of a document, based on a density difference or a color difference between the document and surroundings thereof, and determining a document area, and a control method for image reading.

Description of the Background Art

Many of image reading apparatuses such as multifunction machines and image scanners have, as document reading modes, a mode (platen mode) of scanning a document placed on a document table, and a single pass feeder (SPF) mode of transporting and reading a document by a document feeding device. In both of the modes, normally, an area excluding a margin of a document area is read by detecting a document size. Document sizes detectable by an image reading apparatus are normally limited to so-called standard sizes such as, for example, A3, A4, and A5, or 11"×17", 8.5"×11", and 5.5"×8.5". In order to read a document of a non-standard size (irregular size), a means and the like for manually inputting a length and a width of a document are prepared.

Even if it is rare to read a document of an irregular size, it is cumbersome to manually input a document size at such an occasion. Enabling to detect an accurate document size even if the size is an irregular size is convenient because labor of a cumbersome input operation is not necessary.

As a means for enabling detection of an accurate document size even if the size is an irregular size, there is a method in which a color of a background color plate at a position where a document is read in an SPF mode is a color (e.g., gray) different from a white color, which is a typical ground color of a document, and a contour of the document is determined from an image of the document and an image of the background color plate surrounding the document. The method includes cropping and outputting an area inside the detected contour of the document by a predetermined distance. The method is based on a premise that the ground color of a general document is white, and the contour of the document is discriminated based on a density difference or a color difference between the ground color (white) of a peripheral portion of the document, and the color (e.g., gray) of the background color plate. The function of determining and cropping a contour of a document, based on a density difference or a color difference with respect to surroundings of the document as described above is called an SPF crop function, and a mode using the SPF crop function is called an SPF crop mode in the present specification.

However, when a thin document of a white background color is read by using a background color plate of a color (e.g., gray) other than white, the color of the background color plate may see through to some extent, and the background of a read document image may be blurred due to the influence. In view of the above, some apparatuses have a configuration in which a background color plate is painted separately into a white color area and a gray color area, and a reading position is switched between a non-white area and a white area for a case of a document of an irregular size or documents of different sizes, and for a case of a document other than the above.

In addition, there is a mode in which a document reading apparatus reads documents of a plurality of pages, and removes a blank page from the documents. In order to determine whether each page of documents is a blank page, a blank page determination area inside an edge of a document is determined, and determination is performed by hardware processing or software processing as to whether the number of black pixels or color pixels other than a background (white pixels) in the blank page determination area is equal to or more than a predetermined number. Since pixels other than white pixels, such as a shadow of a document are normally included in a periphery of the document or an area outside the periphery of the document, determination is performed in the blank page determination area inside the edge of the document, as described above. In order to perform accurate blank page determination, it is indispensable to accurately detect a blank page determination area, and in order to accurately detect the blank page determination area, it is indispensable to accurately detect an area inside an edge of a document, specifically, a document area.

However, as described above, types of sizes detectable by a document feeding device and the like are normally limited to standard sizes, and it is not possible to detect a document of an irregular size with high accuracy.

The present disclosure relates to processing of discriminating a contour of a document in the SPF crop mode, and performing blank page determination in an area using the contour as a reference.

As to a function other than the SPF crop function, there is known an image reading apparatus that repeats detection as to whether a blank page detection area of each page is a blank page or not in a case of documents of different sizes, regarding detection of a blank page determination area and removal of a blank page image. A main scanning detection sensor in a document transport path detects a size of a document fed one by one into a document transport path by a document supply roller in a main scanning direction (direction perpendicular to a document transport direction), and derives a standard size of the page. Herein, the main scanning detection sensor is constituted of a plurality of (e.g., about 4 to 10) sensors that detect the presence or absence of a document along the main scanning direction. Further, an area inside an edge of a detected document of a standard size by a predetermined distance in a sub-scanning direction is set as a blank page detection area where detection is performed as to whether the area is blank or not. Detection as to whether the area is blank or not is repeated in the unit of a band within a sub-scanning width of the blank page detection area. By performing blank page determination in the unit of a band, blank page determination is performed without lowering a reading speed, even when documents are successively read one by one from a bundle of documents including documents of different sizes.

A conventional technique relates to a method of performing blank page determination of documents having different sizes without lowering a reading speed. The conventional technique is based on a premise that documents have a standard size, and does not handle documents of an irregular size.

If a size of a document can be determined before each page of documents is read, blank page determination can be performed by, for example, setting a rectangular area (blank page determination area) inside a document area of a known size by a predetermined value at a register roller, and counting the number of black pixels (color pixels) within the blank page determination area. Such an image processing circuit can be achieved with a relatively simple configuration. However, providing a means for detecting a document size including an irregular size before reading a document involves a high cost, taking into consideration a frequency of use of the irregular size. For example, in the configuration of the conventional technique, it is necessary to considerably increase the number of sensors.

The SPF crop function described above determines a contour of a document, based on a density difference (color differences) between an image of a read document and an image of surroundings of the document. Therefore, it is possible to accurately detect a document size, even if a document has an irregular size, and crop a blank page determination area, based on a detected contour of the document. There is no or less cost, as compared with a configuration in which a document size is determined by separately providing a means for detecting the document size including an irregular size. In place of the above, the SPF crop function determines a document size after reading each page of documents. Therefore, time is required for determining a blank page determination area. The larger the document size, the larger the time difference between reading and determination.

The present disclosure has been made in consideration of the above circumstances, and an object of the present disclosure is to balance between a processing speed and a cost pertaining to processing of blank page determination within a reasonable range, even for a document of an irregular size, which is not handled by a document size detector.

SUMMARY OF THE INVENTION

The present disclosure provides an image reading apparatus including: a document feeding device that feeds one or more documents being present at a placement position to a reading position one by one; a document size detector that detects at least one of a length and a width of a fed document before reading, and associates the document with a standard size equal to or approximate to one of a plurality of types of standard sizes whose length and width are default lengths; an image reading device that reads, as an image, a document and surroundings thereof at the reading position; a background color plate disposed in such a way as to be read by the image reading device, as an image of the surroundings; a document area determiner that determines a document area by discriminating a contour of the document, based on a density difference or a color difference between the background color plate and the document in the read image; and a blank page determiner that determines a blank page determination area for determining whether the read document is a blank page or not. In a case where at least one of the length and the width of the document detected by the document size detector is equal to or more than a predetermined threshold value, the blank page determiner determines the blank page determination area, based on the standard size associated by the document size detector, as a reference, and in a case where at least one of the length and the width of the document detected by the document size detector is equal to or less than the threshold value, the blank page determiner determines the blank page determination area, based on the document area, as the reference.

Further, the present disclosure provides, from a different aspect, a control method for image reading including, by a computer: feeding one or more documents to a reading position one by one; detecting at least one of a length and a width of the fed document before reading, and associating the document with a standard size equal to or approximate to one of a plurality of types of standard sizes whose length and width are default lengths; reading, as an image, the document together with a background color plate exposed to surroundings thereof at the reading position; determining a document area by discriminating a contour of the document, based on a density difference or a color difference between the background color plate and the document in the read image; and determining a blank page determination area for determining whether the read document is a blank page or not. In a case where at least one of the detected length and width of the document is equal to or more than a predetermined threshold value, the blank page determination area is determined based on the standard size associated with the document, as a reference, and in a case where at least one of the detected length and width is equal to or less than the threshold value, the blank page determination area is determined based on the document area, as the reference.

In the image reading apparatus according to the present disclosure, the blank page determiner determines the blank page determination area, based on the standard size associated by the document size detector, in a case where at least one of the length and the width of the document detected by the document size detector is equal to or more than the predetermined threshold value, and determines the blank page determination area by the SPF crop function, based on the document area, in a case where at least one of the length and the width is equal to or more than the threshold value. Therefore, it is possible to balance between a processing speed and a cost pertaining to blank page determination associated with a document of an irregular size within a reasonable range.

The control method for image reading according to the present disclosure also has a similar advantageous effect.

DESCRIPTION OF THE PREFERRED EMBODIMENTS

In the following, the present disclosure is described in more detail with reference to the drawings. Note that, the following description is illustrative in all respects, and should not be construed to limit the present disclosure.

First Embodiment

Configuration of Image Reading Apparatus

First, an image reading apparatus according to the present embodiment is described.

Figure 1:
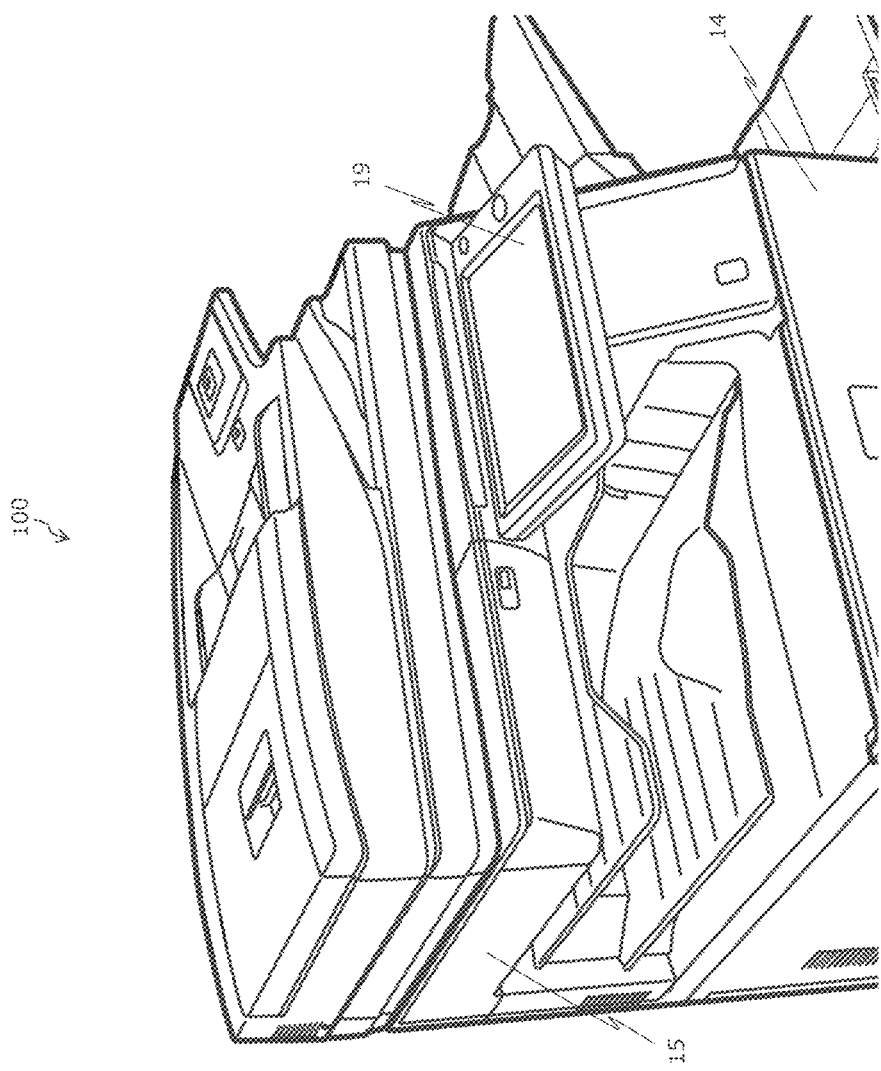
FIG. 1 is a perspective view (a state in which a document feeding device is closed) illustrating a part of an external appearance of a multifunction machine, as one aspect of an image reading apparatus according to the present embodiment.
Figure 2:
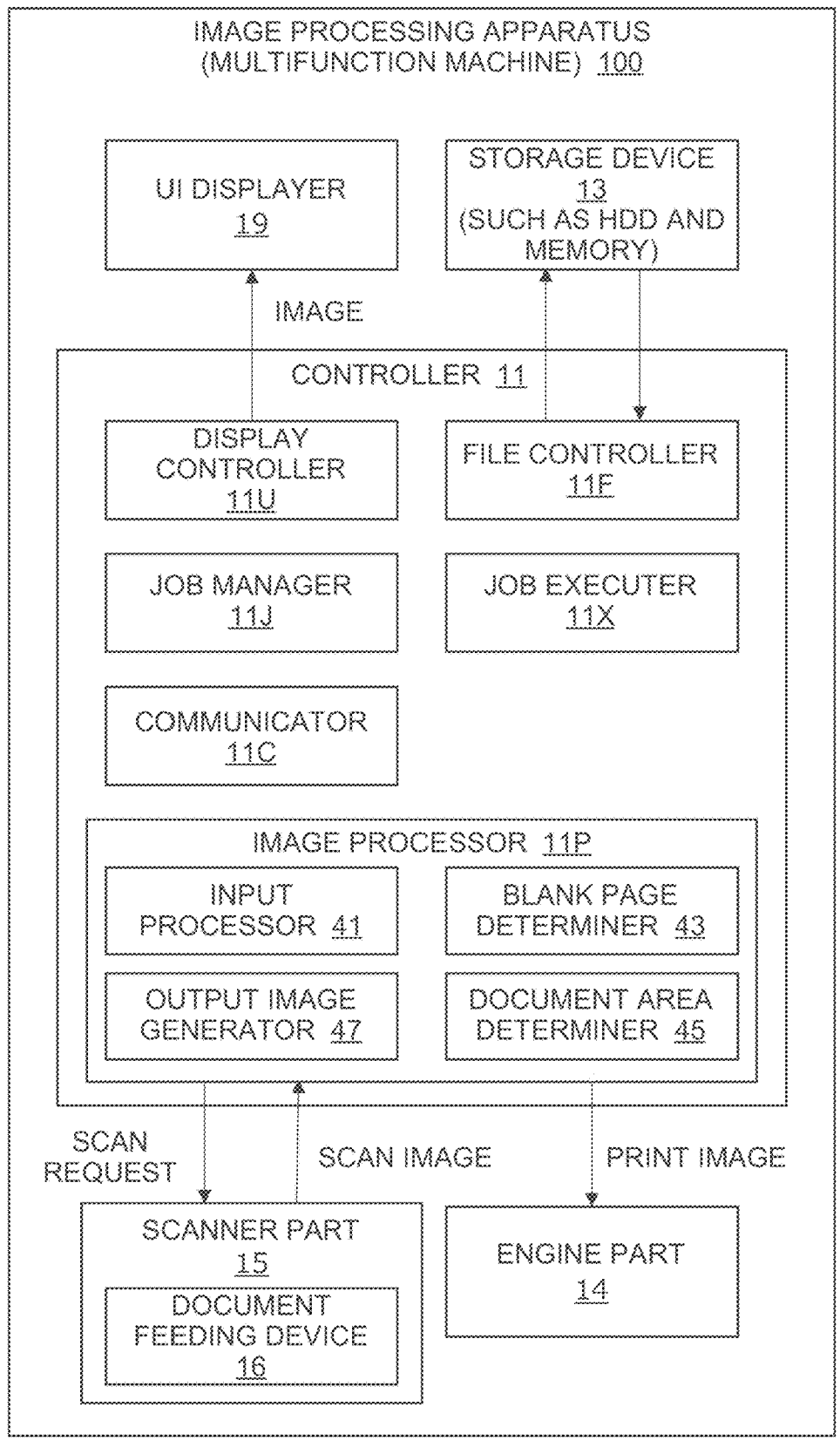
FIG. 2 is a block diagram illustrating an overall configuration of the multifunction machine illustrated in FIG. 1.

FIG. 1 is a perspective view illustrating a part of an external appearance of a multifunction machine, as an aspect of an image reading apparatus according to the present embodiment. FIG. 1 illustrates a portion related to document reading. FIG. 2 is a block diagram illustrating an overall configuration of the multifunction machine illustrated in FIG. 1.

As illustrated in the block diagram in FIG. 2, a multifunction machine 100 includes a controller 11, a storage device 13, an engine part 14 for forming an image, a scanner part 15, and a UI displayer 19 (also referred to as a user interface displayer).

The controller 11 includes a display controller 11U, a file controller 11F, a job manager 11J, a job executer 11X, an image processor 11P, and a communicator 11C. The controller 11 performs control of the multifunction machine 100.

The image processor 11P includes an input processor 41, a blank page determiner 43, a document area determiner 45, and an output image generator 47.

The UI displayer 19 is constituted of, for example, a liquid crystal display device, and displays a screen in accordance with control of the display controller 11U. The UI displayer 19 also includes an operation input device such as a touch panel, and as illustrated in FIG. 1, is installed on a housing of the multifunction machine 100.

The operation input device detects a user operation with respect to the UI displayer 19, and the display controller 11U recognizes an operation signal to be detected by the operation input device.

The file controller 11F stores and reads a file to and from the storage device 13, and performs file expansion and the like to the storage device 13.

The job manager 11J performs processing of registration, deletion, and suspension of various jobs, such as a copy job, a scanner job, or a print job. When a job registered in the job manager becomes ready for execution, the job manager 11J requests the job executer 11X to start executing the job.

The job executer 11X determines whether to start executing a job registered by the job manager 11J, or causes the engine part 14, the scanner part 15, and the image processor 11P to execute a job according to settings. The job executer 11X recognizes a state detected by unillustrated sensors disposed in the scanner part 15 and the engine part 14. Further, the job executer 11X controls an operation of unillustrated motor, actuator, device, and the like disposed in the scanner part 15 and the engine part 14. Further, the image processor 11P controls processing pertaining to an image in the image processor 11P. Further, the image processor 11P performs processing pertaining to a job, such as reading, printing and previewing an image of a document.

The controller 11, as a specific configuration aspect, is mainly constituted of a processor, for example, a central processing unit (CPU) or a micro processing unit (MPU). In addition to the processor, the controller 11 is constituted of hardware resources such as a work memory, an input/output interface circuit, a timer circuit, an image processing circuit, and a communication circuit. The processor executes various jobs pertaining to operation recognition, display control, document image reading, image printing, and the like, specifically, a series of pieces of processing pertaining to image formation by executing a control program stored in advance in the storage device 13. Functions of the controller 11 are achieved by cooperation of software resources and hardware resources.

The storage device 13 includes a volatile memory such as a DRAM, and a non-volatile memory such as an HDD and a flash memory. The storage device 13 stores a control program to be executed by a processor, and an image to be read by the scanner part 15 and processed by the image processor 11P. In addition, the storage device 13 stores data pertaining to control of the file controller 11F, the job manager 11J, the job executer 11X, and the image processor 11P. The storage device 13 may be configured integrally with a memory of the controller 11.

The controller 11 and the engine part 14, and the controller 11 and the scanner part 15 are respectively connected in such a way that data are transferrable.

The communicator 11C includes a circuit for communicating data with an external device via a network.

As illustrated in FIG. 1, the multifunction machine 100 includes a document feeding device 16 (also referred to as an SPF, or a single pass feeder). Since the document feeding device 16 performs document reading in cooperation with the scanner part in the SPF mode, FIG. 3 illustrates that the document feeding device 16 is included in the scanner part 15.

Figure 3:
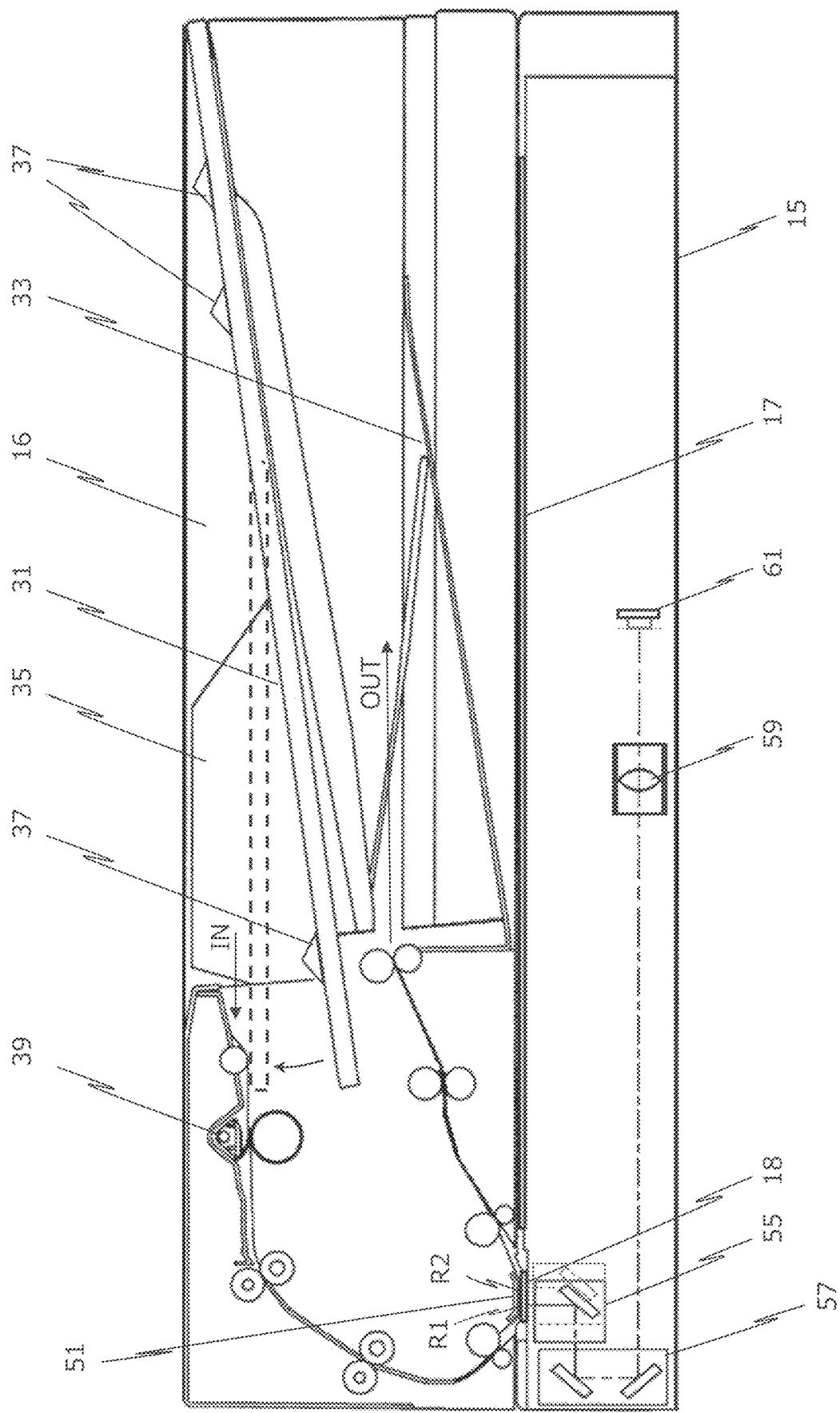
FIG. 3 is an explanatory diagram illustrating a schematic configuration of a scanner part and the document feeding device of the multifunction machine illustrated in FIG. 1.

FIG. 3 is an explanatory diagram illustrating a schematic configuration of the scanner part 15 and the document feeding device 16 of the multifunction machine 100 illustrated in FIG. 1.

As illustrated in FIG. 3, the scanner part 15 includes a document table 17 constituted of a transparent glass plate at an upper position, and on which a document to be read in a platen mode is placed. Also, an SPF reading window 18 is disposed next to the left end of the document table 17. The SPF reading window 18, as well as the document table 17, is constituted of a transparent glass plate. An SPF 16 is openable upward in such a way that the document table 17 is exposed, and a background color plate 51 is disposed at a bottom surface of the SPF 16. When the SPF 16 is closed, the background color plate 51 faces the SPF reading window 18 located below.

The scanner part 15 reads an image of a document under the control of the job executer 11X, and converts the image into an image signal (RGB analog signals). Specifically, the scanner part 15 performs image reading processing in a copy job, a fax job, and a scanner job.

In the SPF mode, the SPF16 illustrated in FIG. 3 separates and feeds a bundle of documents placed at a placement position of a document set tray 31 one by one (see the arrow IN illustrated in FIG. 3), transports the documents via reading positions R1 and R2, and discharges the documents to a document discharge tray 33 (see the arrow OUT in FIG. 3).

The document set tray 31 includes a document guide 35 whose width in a main scanning direction perpendicular to a feeding direction of a document is adjustable, and a document sensor 37 that detects the presence or absence of a document at a plurality of positions in a sub-scanning direction along the feeding direction. The controller 11 recognizes the position of the document guide 35, and the presence or absence of a document at each position by the document sensor 37, and determines a size of the document set on the document set tray 31. The document guide 35 and the document sensor 37 correspond to a document size detector. The document guide 35 can detect a length of a document in the main scanning direction within an error of 1 mm or less, as one example. The document sensor 37 detects the presence or absence of a document at a position associated with a type of a standard size. A transport path sensor 39 that detects passing of a document to be fed is disposed at a midway of a transport path extending from the document set tray 31 to a reading position R1. The transport path sensor 39 has a plurality of photosensors aligned in the main scanning direction, and each photosensor detects a document passing through the position thereof. The transport path sensor 39 corresponds to a document size detector. Thus, it is possible to detect a standard size of a document passing through the sensor in the main scanning direction. However, it is not always possible to detect a trailing end of a document before a leading end of the document reaches the reading position R1 or R2. Specifically, it is not always possible to detect a length of a document in the sub-scanning direction before reading. Therefore, the document size detector can detect a document of a standard size before the document is read, but cannot detect a size of a document of an irregular size.

By moving a position of a first carriage, the controller 11 can switch a reading position of a document in the SPF mode between R1, which is a normal reading position, and R2, which is a reading position in the SPF crop mode (see FIG. 3). In the present embodiment, an area of the background color plate 51 to be read by the scanner part 15 at the reading position R1 is white, which is the same color as a ground color of a general document, and a color of the background color plate 51 to be read by the scanner part 15 at the reading position R2 is gray, which is different from the ground color of a general document.

Both of the reading positions R1 and R2 are located at a position interposed between the SPF reading window 18 at a lower position, and the background color plate 51 at an upper position. A document to be transported passes a position in front of the background color plate 51 at the reading positions R1 and R2.

The scanner part 15 reads a document passing through the reading position R1 or R2. The scanner part 15 reads the background color plate 51, regarding a portion where there is no document. A first carriage 55 is loaded with an LED and a reflective mirror that irradiate a document surface, and a second carriage 57 is loaded with two reflective mirrors. An image of a document passing through the reading position R1 or R2 is formed on an image sensor 61 via the reflective mirrors and an optical lens 59. Note that, the first carriage is also movable beneath the document table 17. In the platen mode, a document is read by scanning the document placed on the document table 17 from below. When the first carriage 55 is moved, the second carriage 57 is moved in the same direction as the first carriage 55 at a half speed of the first carriage 55, and an image of a document placed on the document table 17 is formed on the image sensor 61. The image sensor outputs an image signal associated with a document image.

The image processor 11P generates image data, based on an image signal to be output by the scanner part 15. Alternatively, the image processor 11P generates image data for printing, based on print data received via the communicator 11C. The image processor 11P controls these pieces of processing of the image processor 11P. Generated image data are compiled into an image file in the unit associated with a bundle of documents. The file controller 11F performs processing of generating and managing an image file from image data, and control pertaining to reading and writing of the image file. The image file is printed by the engine part 14, or transmitted to an external device via the communicator 11C.

The input processor 41 of the image processor 11P illustrated in FIG. 2 performs image processing in response to an image signal from the image sensor 61 of the scanner part 15. Further, the input processor 41 generates an image serving as an original of an image for document area determination, and an image for output. The input processor 41 includes circuits that perform A/D conversion of an image signal, shading correction, gradation conversion, and the like.

The blank page determiner 43 is a circuit block that determines a blank page by counting a ratio of black pixels included in a blank page determination area among image signals for each page received from the scanner part 15. A result of the determination is provided to the output image generator 47, and used for control of suppressing output of a blank page. The blank page determination area is an area inside an edge of a document by a predetermined length, specifically, an area to be acquired by cropping a document.

The document area determiner 45 is a circuit block that determines a document area of a read image, based on an image for determination to be output from the input processor 41. In the SPF crop mode in which a document area of an irregular size is determined, the document area determiner 45 determines a document area of a rectangular shape, based on a density difference or a color difference between a periphery of a document, and a gray color of the background color plate 51. In view of that document area determination is determination of a contour of a rectangular document, in order to reduce determination processing load, for example, a black-and-white binary converted image may be used as an image for determination by lowering resolution of a read image. Note that, in determining a rectangular document area, the document area determiner 45 may not only detect a contour of a document, but may also detect a skew, and top and bottom of a target page of documents by performing character recognition processing. Further, a document area may be determined by taking into consideration a skew, and top and bottom of a target page. The determined document area is provided to the output image generator 47, and used for cropping processing of an output image.

The output image generator 47 further performs image processing with respect to an output image to be output from the input processor 41, and generates an image file in a format to be output. Image processing to be performed by the output image generator 47 includes blank page skipping processing based on a determination result of the blank page determiner 43. Furthermore, the image processing includes crop processing of each page based on a document area determined by the document area determiner 45. The crop processing is processing different from crop processing when a blank page determination area is acquired, and is crop processing when an output image is acquired. In addition to the above, image processing by the output image generator 47 may include image quality adjustment, color correction, spatial filter processing, displacement processing, and the like. For example, in a case where an image of a read document is transmitted to a designated destination via the communicator 11C, as an image file in a portable document file (PDF) format, the output image generator 47 generates the image file in a PDF format from image data of each page. Further, the generated image file in a PDF format is output.

Example in Which Blank Page Skipping Processing Based on Blank Page Determination is Performed by Reading Document Next, an example of blank page determination, and blank page skipping based on the blank page determination according to the present embodiment are described.

Figure 4:
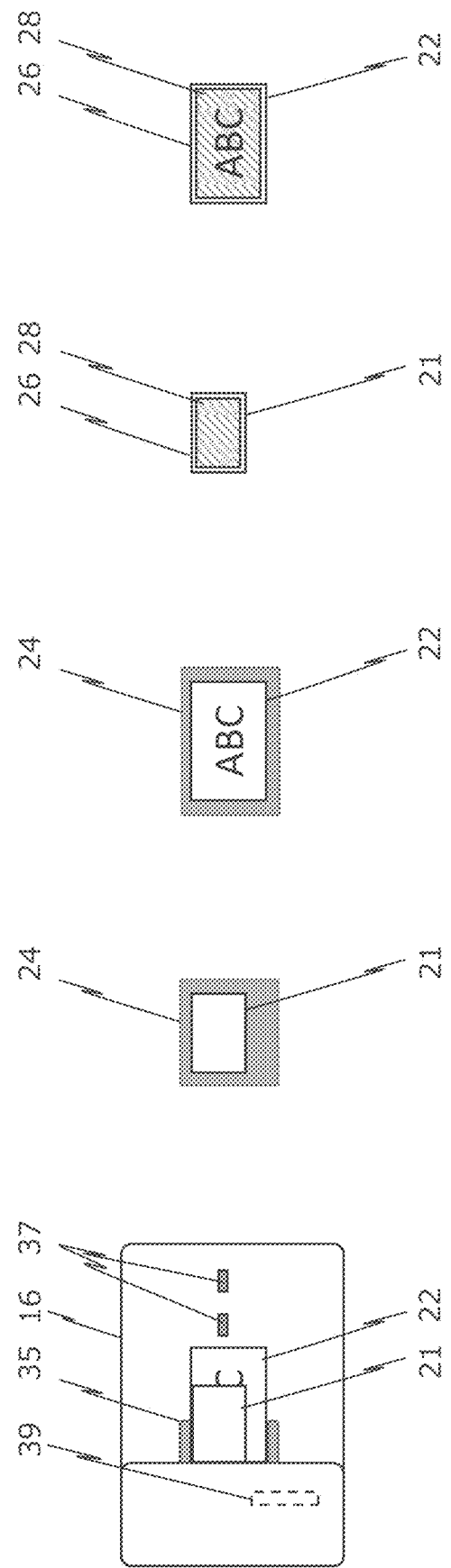
FIG. 4 is an explanatory diagram illustrating an example according to the present embodiment in which documents of different sizes whose size in a main scanning direction is equal to or less than a threshold value are read in the SPF crop mode, and blank page skipping processing is performed.
Figure 5:
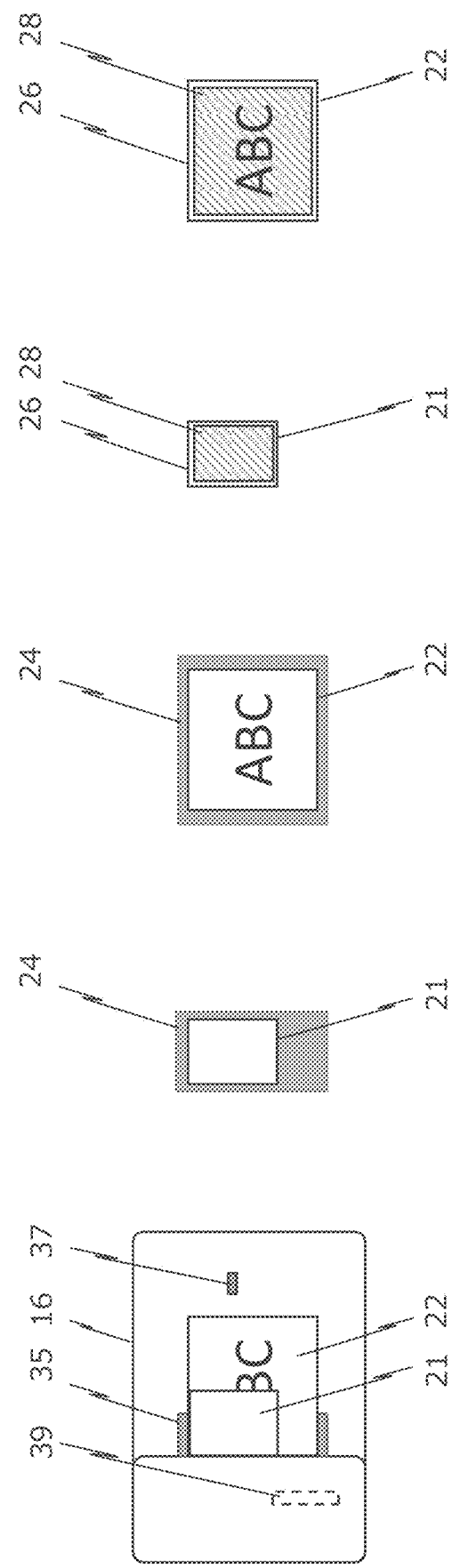
FIG. 5 is an explanatory diagram illustrating an example according to the present embodiment in which documents of different sizes whose size in the main scanning direction is more than the threshold value are read in the SPF crop mode, and blank page skipping processing is performed.
Figure 6:
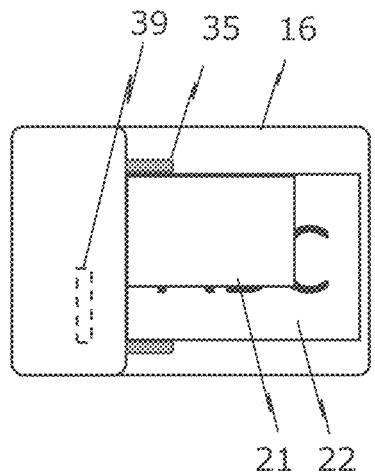
FIG. 6 is an explanatory diagram illustrating an example according to the present embodiment in which documents of different sizes whose standard size in the main scanning direction is more than the threshold value are read without using the SPF crop mode, and blank page skipping processing is performed.
Figure 7:
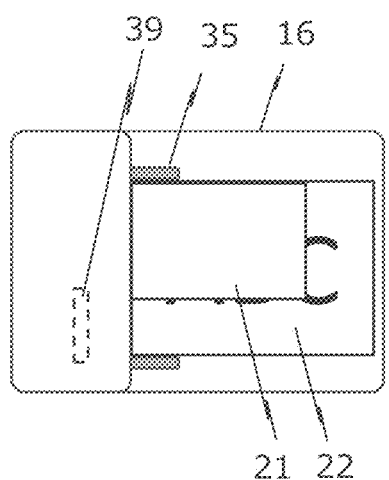
FIG. 7 is an explanatory diagram illustrating an example according to the present embodiment in which documents of different sizes whose irregular size in the main scanning direction is more than the threshold value are read without using the SPF crop mode, and blank page skipping processing is performed.

FIGS. 4 and 5 are explanatory diagrams illustrating examples in which blank page skipping processing is performed by reading documents in a case where the SPF crop mode is enabled. Both of the examples are examples about documents of different sizes, and examples of reading documents in which a first page is a blank page, and a second page is not a blank page. In contrast, FIGS. 6 and 7 illustrate examples in which blank page skipping processing is performed by reading documents of different sizes without using the SPF crop function. FIG. 6 is a case where both of a first page and a second page are documents of a standard size, and FIG. 7 is a case where a first page is a document of an irregular size.

In FIG. 4, the length in the main scanning direction to be detected by the document guide 35 has a size equal to less than a predetermined threshold value. In contrast, in FIG. 5, the length in the main scanning direction to be detected by the document guide 35 has a size more than the above-described threshold value. An example of the threshold value is a length of 140 mm.

In a case of FIGS. 4 and 5, the controller 11, as the job executer 11X, controls the scanner part 15 in such a way as to perform reading in the SPF crop mode. Although a document 21 to be fed as a first page is a document of a size less than the width of the document guide 35, the controller 11, as the input processor 41 causes the scanner part 15 to read an area in the main scanning direction of a size more than the width of the document guide 35 by one size.

Since the transport path sensor 39 detects a standard size of the document 21 in the main scanning direction before reading, the scanner part 15 may be allowed to read an area in the main scanning direction more than the width of the detected standard size by one size. In any case, however, processing of cropping a document area 26 from an image 24 to be read is involved. In the sub-scanning direction, the scanner part 15 is made to read an area in the sub-scanning direction more than the length of each of a leading end and a trailing end of a document to be detected by one size by the transport path sensor 39.

As described above, the main scanning direction of the image 24 to be read illustrated in gray in FIGS. 4 and 5 is associated with the width of the document guide 35, and the sub-scanning direction thereof is associated with an area more than a length of each of a leading end and a trailing end of a document by one size. The image 24 to be read is such that a document area of the document 21 is surrounded by a gray area of the background color plate 51. The same is also applied to an image 24 to be read of a document 22.

The controller 11, as the document area determiner 45, determines the document area 26 of the documents 21 and 22 by discriminating a density difference or a color difference between a ground color of a document of the image 24 to be read in the SPF crop mode, and the background color plate 51 surrounding the document. The controller 11, as the blank page determiner 43, determine a blank page determination area 28 associated with the documents 21 and 22, as an area in which the image 24 to be read is cropped based on the document area 26 acquired as described above. In FIGS. 4 and 5, the blank page determination area 28 is indicated by hatched lines. The blank page determination area 28 is an area inside each of four sides of the document area 26 by a predetermined distance (in one example, inside each of four sides of a document area by 2 mm).

The controller 11, as the blank page determiner 43, determines that the page is blank, when the number of black pixels (color pixels) within a blank page determination area is less than a reference number, and otherwise determines that the page is not blank.

In the examples illustrated in FIGS. 4 and 5, the document 21 as a first page is a blank page, and the document 22 as a second page is not a blank page. Thus, a correct blank page determination result is expected.

Reading in the SPF crop mode as illustrated in FIGS. 4 and 5 can accurately determine a document size, even for a document of an irregular size. Furthermore, a contour of a document can be accurately discriminated, even when the document is somewhat skewed. However, crop processing of the image 24 to be read is mandatory. Therefore, it takes a long time to acquire a result of blank page determination. A processing time until a result of blank page determination is acquired depends on a document size, and the larger the document, the longer the required processing time. Time required for blank page determination processing may affect a user operation pertaining to pre-confirmation on file output, in addition to affecting the time until a file is output. In other words, it is a matter that also affects operability of an image reading apparatus.

According to the present embodiment, as far as a document is a small document whose length in the main scanning direction (width of a document) to be detected by the document guide 35 before reading is equal to or less than a threshold value (in one example, 140 mm), the controller 11 performs document reading in the SPF crop mode. In a case where the width of the document guide 35 is equal to or less than the threshold value, time required for crop processing and blank page determination processing after the crop processing is shorter than the time required for a document whose size is more than the threshold value. Therefore, there is little difference in a processing time with respect to reading without using the SPF crop mode. In addition, since there is a high possibility that a receipt or a business card is set, and they normally belong to a document of an irregular size, it is reasonable to perform reading in the SPF crop mode.

On the other hand, in a case of a large document whose width exceeds a threshold value, the controller 11 reads the document without using the SPF crop mode. It is often a case that a document of a large size has a standard size. In view of the above, crop processing of an image to be read is omitted. By determining a blank page determination area, based on a document size to be detected before reading, and performing blank page determination, a processing time can be shortened, as compared with reading in the SPF crop mode.

Note that, as will be described later in a second embodiment, it may be possible to determine whether a size of a document placed on the document set tray 31 (a document size to be detected by the document guide 35 and the document sensor 37) is a standard size or an irregular size, and switch whether the document is read in the SPF crop mode according to determination.

FIGS. 6 and 7 are examples in which documents of different sizes are read without using the SPF crop function. FIG. 6 illustrates an example in which a document width detected by the document guide 35 lies within a predetermined range (e.g., within an error range of ±1 mm) with respect to a default length associated with a standard size. Herein, the default length indicates either a length or width of a so-called standard sized document, such as, for example, 297 mm and 210 mm equal to the length and the width of an A4-sized document, and 257 mm and 182 mm equal to the length and the width of a B5-sized document. The lengths are not limited to the AB series, but also include lengths in inches such as 279.4 mm and 215.9 mm equal to the length and the width of a letter-sized document. On the other hand, FIG. 7 is an example of a case where a document width detected by the document guide 35 does not lie within the predetermined range with respect to the default length.

As illustrated in FIGS. 6 and 7, the controller 11, as the job executer 11X, controls the scanner part 15 in such a way that reading in the SPF crop mode is not performed, in a case where a document width detected by the document guide 35 is more than a threshold value. The document 21 to be fed as a first page is a document whose size is less than the width of the document guide 35.

The controller 11, as the input processor 41 and the document area determiner 45, recognizes a default length (a length corresponding to a length or a width of any standard size) to be detected by the transport path sensor 39 after document feeding. Further, the scanner part 15 is made to read an area associated with the default length detected by the transport path sensor 39. In the sub-scanning direction, the controller 11, as the input processor 41 and the document area determiner 45, causes the scanner part 15 to read an area in the sub-scanning direction associated with any of the standard sizes, based on a length of each of a leading end and a trailing end of a document to be detected by the transport path sensor 39.

For example, it is assumed that, after a leading end of a document passes through the transport path sensor 39, the transport path sensor 39 determines that the length of the document in the main scanning direction is a length corresponding to a long side of an A4 document or a short side of an A3 document. In this case, the length of the document in the sub-scanning direction is determined based on detection of the transport path sensor 39. An image 24 to be read illustrated in FIGS. 6 and 7 represents an area of a standard size associated with a leading end and a trailing end of a document detected by the transport path sensor 39. The image 24 to be read acquired as described above is associated with a document area of the document 21 without crop processing, in a case of a standard-sized document illustrated in FIG. 6. Likewise, the image 24 to be read of the document 22 to be fed as a second page is associated with a document area of the document 22 as the second page. In a case of a standard-sized document, crop processing after acquisition of the image 24 to be read is not necessary.

In a case of an irregular-sized document illustrated in FIG. 7, the image 24 to be read based on detection of a standard size by the transport path sensor 39 is larger in the main scanning direction than the original document area of the document 21. As a result of rounding up the irregular size to a standard size approximate to the irregular size, the image 24 to be read includes an area other than the document 21. The image 24 to be read is a gray area of the background color plate 51. However, since the reading is reading without using the SPF crop mode, the controller 11 assumes that an image to be read is a document area of the document 21.

The controller 11, as the blank page determiner 43, determines the blank page determination area 28 associated with the documents 21 and 22, based on the document area 26. Consequently, the blank page determination area 28 includes the gray area of the background color plate 51, and therefore, the blank page determiner 43 cannot make correct blank page determination.

In FIG. 7, the blank page determination area 28 is indicated in hatched lines. Note that, the blank page determination area 28 illustrated in FIGS. 6 and 7 is an area inside each of four sides of the document area 26 by a predetermined distance (in one example, inside each of four sides of a document area by 2 mm).

In a document of a standard size as illustrated in FIG. 6, the document 21 as a first page is a blank page, and the document 22 as a second page is not a blank page, and a correct result is expected. However, in a document of an irregular size as illustrated in FIG. 7, both of the document 21 as a first page, and the document 22 as a second page are determined not to be a blank page. Regarding the document 21 as a first page of an irregular size, a correct result is not acquired.

Second Embodiment

As described above, in the first embodiment, when a document width is more than a threshold value, reading without using the SPF crop mode is performed. Therefore, although a processing time for blank page determination is shorter than that in the SPF crop mode, a correct result may not be acquired for a document of an irregular size.

In the present embodiment, in a case where a document width is more than a threshold value, as far as a possibility that the document is a document of an irregular size is high, priority is given to accurate blank page determination rather than a processing time. On the other hand, as far as a probability that the document is a document of an irregular size is high, priority is given to shortening a processing time by performing reading without using the SPF crop mode, as well as the first embodiment.

Determination as to whether a possibility of a document of an irregular size is high, or a possibility of a document of a standard size is high is made based on a document width to be detected by a document guide 35 before reading. This is because, in the present embodiment, it is the document guide 35 that can detect a document size including an irregular size before reading.

In a case where a document width to be detected by the document guide 35 is more than a threshold value, a controller 11, as an input processor 41 and a document area determiner 45, further determines whether the document width lies within a predetermined range (e.g., within an error range of ±1 mm) with respect to a default length.

In a case where a document width lies within the above-described range with respect to the default length, the controller 11 determines that a possibility that the document is a document of a standard size is high, and similarly to the first embodiment, reading without using the SPF crop mode is performed. In a case where a small document of an irregular size is included as illustrated in FIG. 7, accurate blank page determination may not be acquired. However, even when there is an error in blank page determination, erroneous determination occurs on the safe side. Specifically, as is obvious from the example in FIG. 7, a blank page document may not be removed due to erroneous determination, but there is no likelihood that a document, which is not a blank page, may be removed due to erroneous determination. In other words, there is no likelihood that information that should be present is missing due to erroneous determination.

On the other hand, in a case where a document width is out of the range with respect to the default length, it is determined that a possibility that the document is a document of an irregular size is high, and reading in the SPF crop mode is performed. As illustrated in FIG. 5, reading in the SPF crop mode enables to determine an appropriate document area and an appropriate blank page determination area even for an irregular-sized document. Although it takes a longer processing time for blank page determination than in the SPF crop mode, a correct result can be acquired.

Third Embodiment

In a case where a document width to be detected by a document guide 35 is more than a threshold value, reading without using the SPF crop mode is uniformly performed as in the first embodiment, or switching between on and off of the SPF mode is performed according to a relationship between a document width and a default length, as in the second embodiment may be selected by settings.

Furthermore, in a case where a document width is more than a threshold value, reading in the SPF mode may be uniformly performed.

Since a frequency (ratio) of reading a document of an irregular size depends on documents to be handled by a user, the user may be able to set an appropriate operation according to a usage condition. For a user who rarely reads a document of an irregular size, it is sufficient to set in such a way that a processing speed is prioritized for a document of a width larger than a threshold value, as in the first embodiment. A user who frequently reads a document of an irregular size may set in such a way that reading in the SPF crop mode is performed by prioritizing accurate blank page determination even for a document of a width larger than a threshold value. A user who does not perform any of the above may set in such a way that on and off of the SPF crop mode is switched according to a relationship between a document width and a default length.

Flowchart on Document Reading and Blank Page Determination

Processing of the controller 11 described in the first and second embodiments is described with reference to flowcharts.

Figure 8:
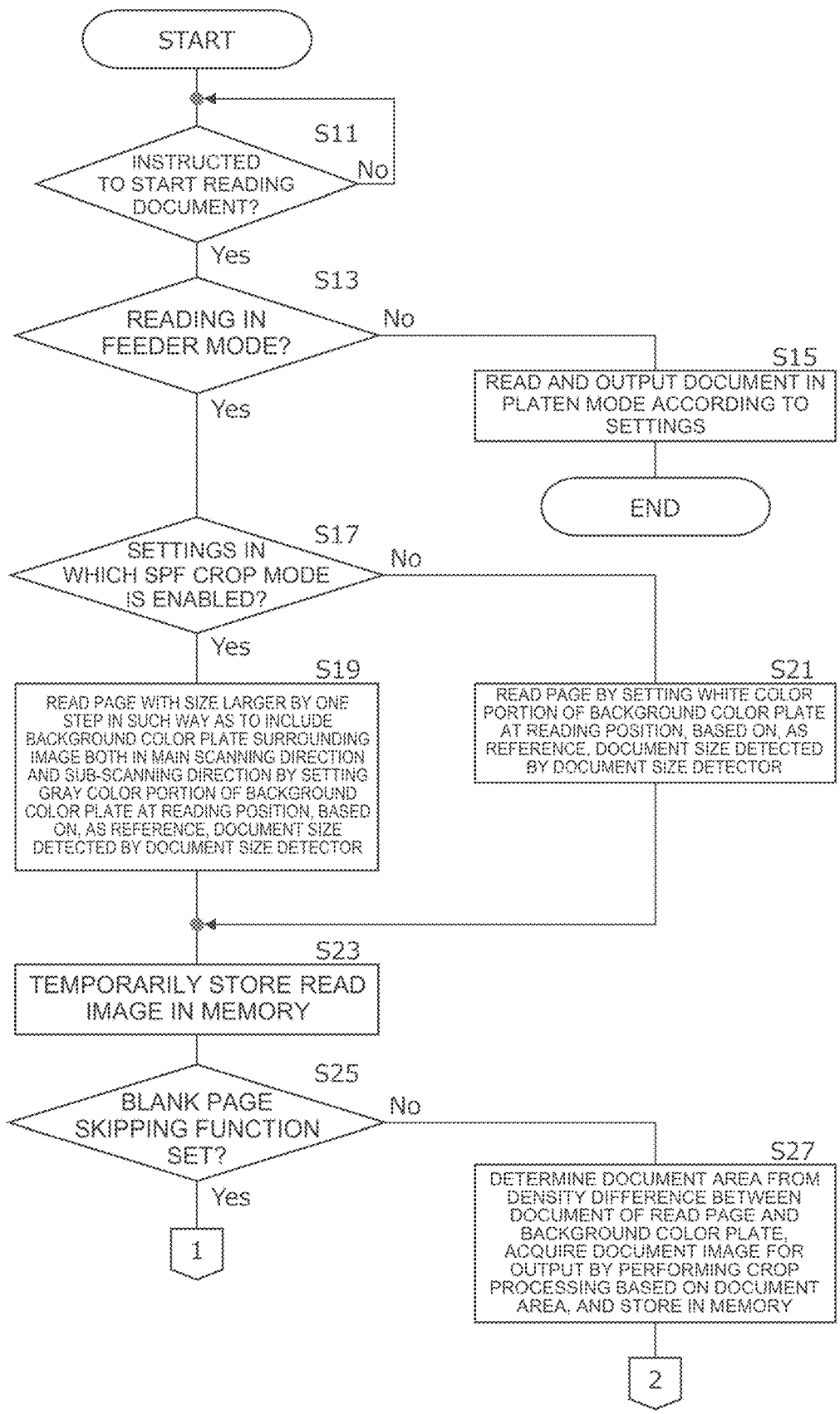
FIG. 8 is a first flowchart illustrating document reading processing to be performed by a controller in the present embodiment.
Figure 9:
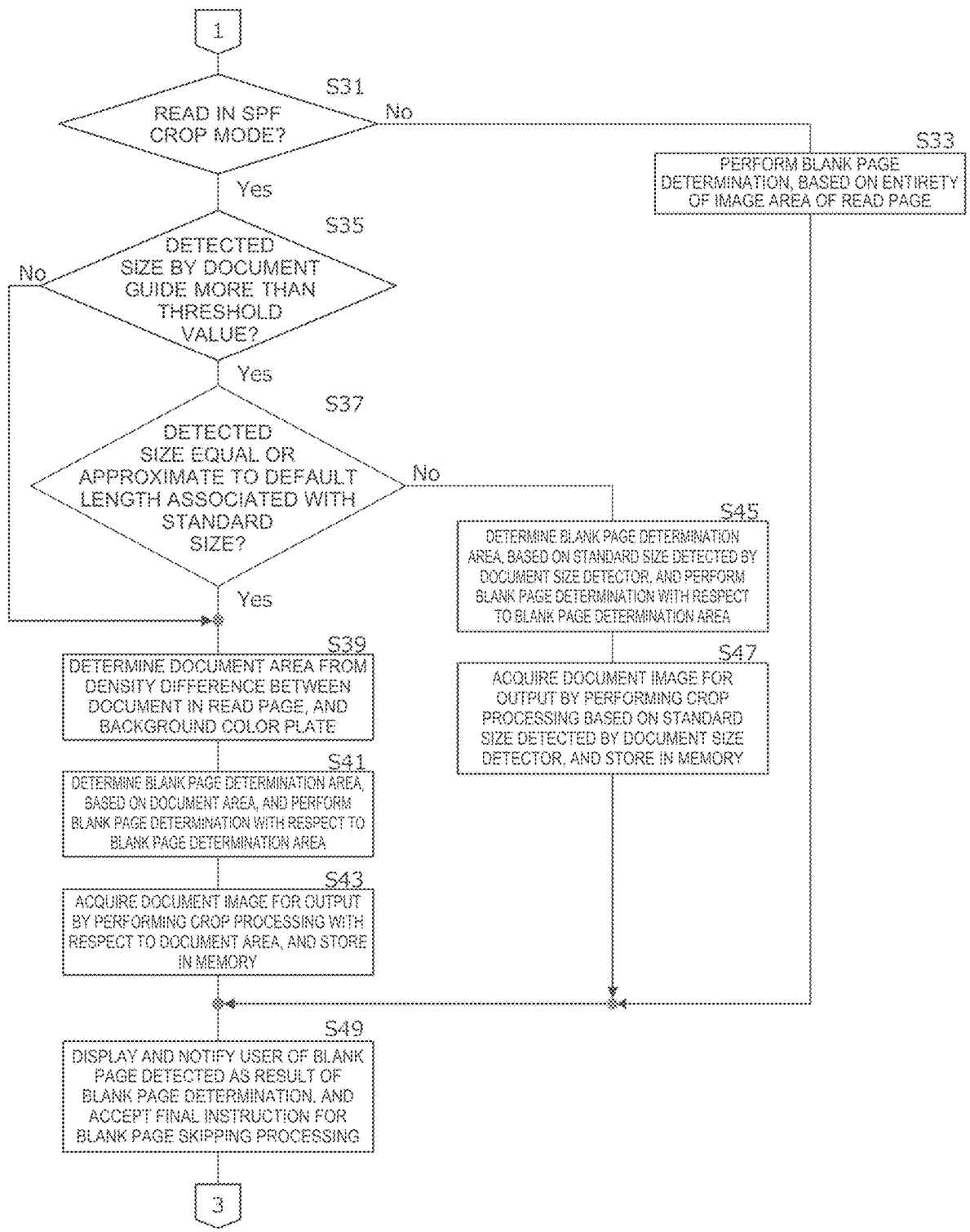
FIG. 9 is a second flowchart illustrating the document reading processing to be performed by the controller in the present embodiment.
Figure 10:
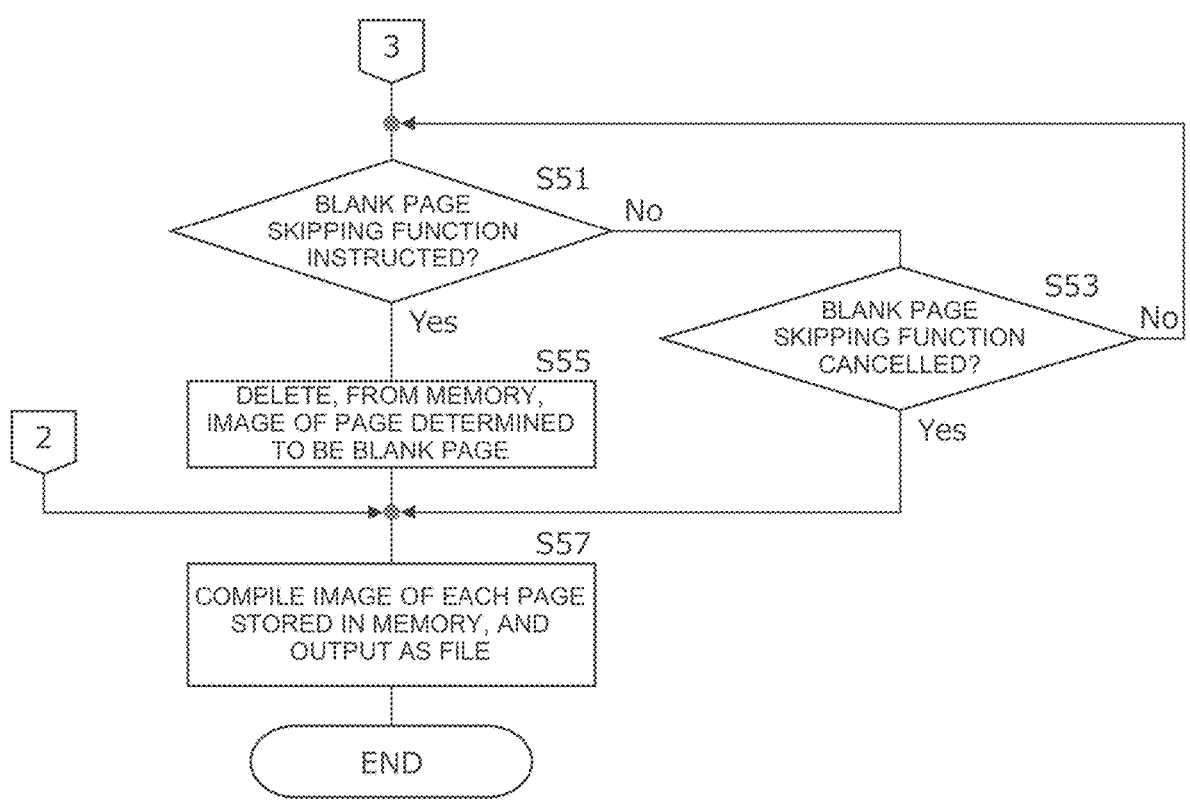
FIG. 10 is a third flowchart illustrating the document reading processing to be performed by the controller in the present embodiment.

FIGS. 8 to 10 are flowcharts illustrating document reading processing to be performed by the controller in the first and second embodiments.

As illustrated in FIG. 8, when the display controller 11U accepts an instruction to start reading a document from the user via the UI displayer 19 (Yes in step S11), the controller 11, as the job executer 11X, determines whether the reading is reading in a feeder mode or reading in a platen mode (step S13). In a case where reading in the platen mode is performed (No in step S13), the document table 17 is scanned by controlling an unillustrated scanner motor, and moving the first carriage 55, and a document placed on the document table 17 is read. The output image generator 47 generates and outputs a file from the read image (step S15), and the processing is terminated.

In a case where reading in the feeder mode is performed (Yes in step S13), the controller 11, as the job executer 11X, determines whether to read the document in the SPF crop mode (step S17).

In a case where reading in the SPF crop mode is performed (Yes in step S17), the controller 11, as the input processor 41, allows a reading operation by moving the first carriage 55 to the reading position R2 associated with a gray color of a background color plate 51. Then, as described in FIGS. 4 and 5, the controller 11 causes the scanner part 15 to read an area larger than the length and the width of the document by one size (step S19). Then, the read image is temporarily stored in the storage device 13.

In a case where reading without using the SPF crop mode is performed (No in step S17), the controller 11, as the input processor 41, allows a reading operation by moving the first carriage 55 to the reading position R1 associated with a white color of the background color plate 51. Then, as described in FIGS. 6 and 7, the controller 11 causes the scanner part 15 to read an area determined based on a document size detected by the document size detector before reading (step S21). Then, the read image is temporarily stored in the storage device 13.

Subsequently, the controller 11, as the job executer 11X, determines whether a blank page skipping function is set (step S25).

In a case where the blank page skipping function is not set (No in step S25), the controller 11, as the document area determiner 45, determines the document area 26, based on a density difference or a color difference between the ground color of the document, and the gray color of the background color plate 51. The controller 11, as the output image generator 47, performs crop processing based on the document area 26, and stores an image for output in the storage device 13 (step S27). Then, when images for output of each page are accumulated, the images are compiled and output as a file (step S57 illustrated in FIG. 10).

On the other hand, in a case where the blank page skipping function is set (Yes in step S25), the controller 11, as the job executer 11X, determines whether the image 24 to be read is an image read in the SPF crop mode (step S31 illustrated in FIG. 9).

In a case where the image is not an image read in the SPF crop mode, the controller 11, as the blank page determiner 43, determines the blank page determination area 28, based on the entire area of the image 24 to be read, as illustrated in FIGS. 6 and 7, and after performing blank page determination (step S33), the processing proceeds to step S49.

On the other hand, when the image is the image 24 to be read, which has been read in the SPF crop mode (Yes in step S31), the controller 11, as the document area determiner 45, determines whether a document width detected by the document guide 35 is more than a threshold value (step S35).

In a case where the document width is more than the threshold value (Yes in step S35), processing differs between an aspect in the first embodiment and an aspect in the second embodiment.

According to an aspect of the first embodiment, in a case where a document width is more than a threshold value, the controller 11, as the blank page determiner 43, determines a blank page determination portion, based on the standard size detected by the document size detector including the transport path sensor 39, and performs blank page determination (in the aspect of the first embodiment, determination processing in S37 illustrated in FIG. 9 is skipped, and processing proceeds to processing in step S45. See FIGS. 6 and 7). Also, the controller 11, as the output image generator 47, acquires an image for output by cropping the image 24 to be read based on the standard size detected by the document size detector, and temporarily stores the image in the storage device 13 (step S47). Then, the processing proceeds to step S49 to be described later.

According to an aspect of the second embodiment, in a case where a document width is more than a threshold value, the controller 11, as the blank page determiner 43, determines whether the detected document width lies within a predetermined range with respect to a default length (processing in step S37 is performed).

In a case where the document width lies within the predetermined range with respect to the default length, specifically, the document width is equal to or approximate to any of the standard sizes (Yes in step S37), the controller 11 proceeds the processing to step S39 to be described later, and determines the document area 26 and the blank page determination area 28 by the SPF crop function.

On the other hand, in a case where the document width does not lie within the predetermined range with respect to the default length, specifically, the document width is equal to an irregular size (No in step S37), the controller 11 proceeds the processing to the above-described step S45, and determines the blank page determination area 28, based on the standard size detected by the document size detector.

In the above-described step S35, in a case where the document width is equal to or less than the threshold value (No in step S35), the controller 11, as the document area determiner 45, determines the document area 26, based on a density difference or a color difference between the ground color of the document, and the gray color of the background color plate 51 (step S39). In addition, the controller 11, as the blank page determiner 43, determines the blank page determination area 28, based on the determined document area, and performs blank page determination for the blank page determination area 28 (step S41). Also, the controller 11, as the output image generator 47, acquires an image for output, based on the document area 26 by removing a page determined to be a blank page, and stores the image in a memory (step S43).

After reading of each page has been finished, the controller 11, as the job executer 11X, causes the UI displayer 19 to display an image of a page or the number of pages determined to be a blank page by the blank page determiner 43 (step S49). Then, the controller 11 waits for an instruction for confirmation from the user (a loop via No in step S51 and No in step S53 illustrated in FIG. 10).

In response to an instruction to approve blank page skipping based on a result of blank page determination via the UI displayer 19 (Yes in step S51), the controller 11, as the output image generator 47, deletes the blank page (step S55). Then, the controller 11 compiles the images of each page stored in the storage device 13, outputs the images as a file (step S57), and terminates the document reading processing.

On the other hand, in a case the controller 11 accepts an instruction to cancel blank page skipping by the user (Yes in step S55), the controller 11, as the output image generator 47, compiles the images of each page, and output the images as a file without deleting the blank page (step S57). Then, the controller 11 terminates the document reading processing.

As described above, (i) an image reading apparatus according to the present disclosure includes: a document feeding device that feeds one or more documents being present at a placement position to a reading position one by one; a document size detector that detects at least one of a length and a width of a fed document before reading, and associates the document with a standard size equal to or approximate to one of a plurality of types of standard sizes whose length and width are default lengths; an image reading device that reads, as an image, a document and surroundings thereof at the reading position; a background color plate disposed in such a way as to be read by the image reading device, as an image of the surroundings; a document area determiner that determines a document area by discriminating a contour of the document, based on a density difference or a color difference between the background color plate and the document in the read image; and a blank page determiner that determines a blank page determination area for determining whether the read document is a blank page or not. In a case where at least one of a length and a document width detected by the document size detector is equal to or more than a predetermined threshold value, the blank page determiner determines the blank page determination area, based on the standard size associated by the document size detector, as a reference, and in a case where at least one of a length and a document width detected by the document size detector is equal to or less than the threshold value, the blank page determiner determines the blank page determination area, based on the document area, as the reference.

In the present disclosure, the document size detector includes a sensor that detects a document size of each document before reading, and a processor that performs processing of associating a document with any of standard sizes, based on the detection.

A specific aspect of the sensor is, for example, tentatively determining a standard size by detecting a length and a width of a document being present at a placement position, and determining a standard size to be associated with the document by detecting either of the length or the width of the fed document before the document reaches the reading position. An example of a more specific aspect is a guide width detection mechanism that detects a position of a guide slidable in the main scanning direction (orthogonal to a feeding direction) of a document to be fed from the placement position. It is assumed that the position of the guide is adjusted by the user according to a size of a document at the placement position. Further, the mechanism includes a sensor that detects a size of a document in a feeding direction (also referred to as a sub-scanning direction) at the placement position. The document size detector may further include a main scanning detection sensor disposed in a document transport path extending from a placement position to a reading position, as described above in the conventional technique.

A specific aspect of the above-described processor is a control circuitry mainly including a processor and a memory.

In addition, the standard sizes are several sizes of rectangular documents having a length and a width, which are generally and frequently used. Specific aspects of the standard sizes are sizes set in an image reading apparatus such as, for example, A3, A4, and A5, or 11"×17", 8.5×11", and 5.5"×8.5". However, the standard sizes are not limited to these sizes, and may be set or selected individually by the image reading apparatus. In contrast to the standard sizes, the irregular size designates a size that is not a standard size. Note that, in the present specification, the length and the width of a standard size are called default lengths.

Furthermore, the image reading device is one that reads an image by scanning a document. As specific aspects of the device, for example, a linear image sensor such as a charge coupled device (CCD) and a contact image sensor (CIS), and a driving circuit thereof, and a signal processing circuit are exemplified.

The background color plate is a component disposed behind a document to be transported in a reading area where the image reading device reads the document. In a case of a document whose size in the main scanning direction is smaller than the size of the reading area, the background color plate is exposed in an area where there is no document in the main scanning direction. Further, the background color plate is exposed in the entire area in the main scanning direction before a leading end of the document passes therethrough, and after a trailing end of the document passes therethrough. When a contour of a document is discriminated, the background color plate at the reading position has a color (e.g., gray) other than the ground color (white) of the document. In contrast, in a case where a contour of a document is not discriminated, specifically, when blank page determination is performed based on the standard size associated by the document size detector, the background color plate at the reading position may have the same color as the ground color (white) of the document.

Both of the document area determiner and the blank page determiner are achieved by organically combining pieces of processing of an image processing circuit and a processor. However, which one of the image processing circuit or the processor performs main processing depends on a content of the processing, and a configuration of the image processing circuit.

In a case where blank page determination is performed by determining a blank page determination area, based on the standard size associated by the document size detector before reading, the blank page determination processing is relatively simple, and has high affinity with processing mainly executable by the image processing circuit. In the present specification, it is assumed that the image processing circuit mainly performs blank page determination processing, in a case where an associated standard size is used as a reference. In contrast, blank page determination processing in a case where a document area based on a contour of a document is used as a reference is not as simple as the above-described case where the associated standard size is used as a reference. If it is difficult to prepare an image processing circuit associated with the processing, taking into consideration the cost, the processing is performed mainly by a processor.

Further, a preferred aspect of the present disclosure is described.

(ii) The blank page determiner may compare at least one of the detected length and width with a default length pertaining to the standard size associated with the document, in place of setting, to the associated standard size, the reference to be applied to a case where at least one of the detected length and width is more than the threshold value, and in a case where a difference between the detected length and the default length is out of a predetermined range, the blank page determiner may set the document area, as the reference, and in a case where the difference lies within the predetermined range, the blank page determiner may set the associated standard size, as the reference.

Thus, only in a case where either of the length or the width detected by the document size detector is approximate to the standard size of a document having a default length, a processing time for blank page determination can be saved by performing blank page determination, based on the standard size associated by the document size detector. On the other hand, in a case where either of the detected length or width is not approximate to the standard size of a document having a default length, blank page determination is performed based on the document area to be determined by the SPF crop function. Thus, a blank page determination area can be determined accurately even when a document has an irregular size.

(iii) The document size detector may detect at least one of the length and the width of the document on a document transport path extending from the placement position to the reading position.

Thus, the document size detector detects a document size on the document transport path before a fed document reaches the reading position. Therefore, the document size can be detected before reading.

(iv) The image reading apparatus may further include a setter that accepts settings as to whether the reference to be applied in determining the blank page determination area is fixedly set to the document area, or is switched according to a relationship between at least one of the detected length and width, and the threshold value.

Thus, settings can be made in such a way as to perform blank page determination, based on the document area to be fixedly determined by the SPF crop function by giving priority to accurately determining the blank page determination area even for a document of an irregular size. Alternatively, settings can be made in such a way as to switch a reference based on which a blank page determination area is determined by determination as to whether either of the length or the width detected by the document size detector is approximate to a standard size of a document having a default length. Settings can be selectively performed according to a usage status of the image reading apparatus.

(v) The image reading apparatus may further include a blank page remover that, when data of the document read by the image reading device are output, suppresses output of a document determined to be a blank page by the blank page determiner, and outputs only a document determined not to be a blank page.

Thus, output of a blank page document can be suppressed based on a result of determination by the blank page determiner when one or more documents are read.

(vi) An aspect of the present disclosure includes a control method for image reading including, by a computer: feeding one or more documents to a reading position one by one; detecting at least one of a length and a width of a fed document before reading, and associating the document with a standard size equal to or approximate to one of a plurality of types of standard sizes whose length and width are default lengths; reading, as an image, the document together with a background color plate exposed to surroundings thereof at the reading position; determining a document area by discriminating a contour of the document, based on a density difference or a color difference between the background color plate and the document in the read image; and determining a blank page determination area for determining whether the read document is a blank page or not. In a case where at least one of the detected length and width of the document is equal to or more than a predetermined threshold value, the blank page determination area is determined based on the standard size associated with the document, as a reference, and in a case where at least one of the detected length and width is equal to or less than the threshold value, the blank page determination area is determined based on the document area, as the reference.

An aspect of the present disclosure also includes any combination of the above-described plurality of aspects.

In addition to the embodiments described above, various modifications of the present disclosure are available. These modifications should not be construed as not belonging to the scope of the present disclosure. The present disclosure should include the meaning equivalent to the scope of the claims and all modifications within the scope.

What is claimed is:

1. An image reading apparatus comprising:
   a document feeding device that feeds one or more documents being present at a placement position to a reading position one by one;
   a document size detector that detects at least one of a length and a width of the one or more documents, which are fed to the reading position before reading, and associates the one or more documents with a standard size equal to or approximate to one of a plurality of types of standard sizes having a length and a width, which are default sizes;
   an image reading device that reads, as an image, the one or more documents and surroundings thereof at the reading position;
   a background color plate disposed in such a way that the image reading device reads the background color plate as an image of the surroundings;
   a document area determiner that determines a document area by detecting a contour of the one or more documents based on a density difference or a color difference between the background color plate and the one or more documents in the read image; and
   a blank page determiner that determines whether the one or more documents read by the image reading device is a blank page using a blank page determination area, wherein:
   in a case where at least one of the length and the width of the one or more documents detected by the document size detector is more than a predetermined threshold value, the blank page determiner determines the blank page determination area, based on the standard size associated by the document size detector, as a reference,
   in a case where at least one of the length and the width of the one or more documents detected by the document size detector is equal to or less than the predetermined threshold value, the blank page determiner determines the blank page determination area, based on the document area, as the reference,
   in a case where the predetermined threshold value is used for the detected length of the one or more documents, the predetermined threshold value is less than a length of a maximum document size that the document side detector is capable of detecting and in a case where the predetermined threshold value is used for the detected width of the one or more documents, the predetermined threshold value is less than a width of the maximum document size, and
   the predetermined threshold value is less than half of a maximum detectable size of the document size detector.

2. The image reading apparatus according to claim 1, wherein
   the blank page determiner further compares at least one of the length and the width detected by the document size detector with a default length pertaining to the standard size associated with the one or more documents, in place of setting, to the associated standard size, the reference to be applied to a case where at least one of the detected length and the detected width is more than the predetermined threshold value, and in a case where a difference between the detected length and the default length is out of a predetermined range, the blank page determiner sets the document area, as the reference, and in a case where the difference lies within the predetermined range, the blank page determiner sets the associated standard size, as the reference.

3. The image reading apparatus according to claim 1, wherein
   the document size detector further detects at least one of the length and the width of the one or more documents on a document transport path extending from the placement position to the reading position.

4. The image reading apparatus according to claim 1, further comprising
   a setter that accepts settings as to whether the reference to be applied in determining the blank page determination area is fixedly set to the document area, or is switched according to a relationship between at least one of the length and the width of the one or more documents detected by the document size detector, and the predetermined threshold value.

5. The image reading apparatus according to claim 1, further comprising
   a blank page remover that, when data of the one or more documents read by the image reading device are output, suppresses output of documents of the one or more documents which are determined to be blank pages by the blank page determiner, and outputs only documents of the one or more documents, which are determined not to be blank pages.

6. A control method for image reading by a computer comprising:
   feeding one or more documents to a reading position one by one;
   detecting at least one of a length and a width of the one or more documents, which are fed to the reading position before reading, and associating the one or more documents with a standard size equal to or approximate to one of a plurality of types of standard sizes having a length and a width, which are default sizes;
   reading, as an image, the one or more documents and a background color plate exposed to surroundings thereof at the reading position;
   determining a document area by detecting a contour of the one or more documents based on a density difference or a color difference between the background color plate and the one or more documents in the read image; and determining a blank page determination area for determining whether the one or more documents, which is read as the image, is a blank page, wherein:

in a case where at least one of the detected length and the detected width of the one or more documents is more than a predetermined threshold value, the blank page determination area is determined based on the standard size associated with the one or more documents, as a reference, in a case where at least one of the detected length and the detected width is equal to or less than the predetermined threshold value, the blank page determination area is determined based on the document area, as the reference, in a case where the predetermined threshold value is used for the detected length of the one or more documents, the predetermined threshold value is less than a length of a maximum document size that is detectable and in a case where the predetermined threshold value is used for the detected width of the one or more documents, the predetermined threshold value is less than a width of the maximum document size, and the predetermined threshold value is less than half of a maximum detectable size of the document size detector.

* * * * *